United States Patent [19]
Nakamura

[11] Patent Number: 5,090,726
[45] Date of Patent: Feb. 25, 1992

[54] SUSPENSION CONTROL SYSTEM

[75] Inventor: Kenichi Nakamura, Kanagawa, Japan

[73] Assignee: Tokico, Ltd., Kanagawa, Japan

[21] Appl. No.: 584,576

[22] Filed: Sep. 18, 1990

[30] Foreign Application Priority Data

Sep. 21, 1989 [JP] Japan .................................. 1-246159

[51] Int. Cl.$^5$ .............................................. B60G 11/26
[52] U.S. Cl. .................................. 280/707; 280/709;
280/714; 137/596.12
[58] Field of Search ...................... 280/707, 709, 714;
137/596.12

[56] References Cited

U.S. PATENT DOCUMENTS

| | | | |
|---|---|---|---|
| 4,202,250 | 5/1980 | Zeuner et al. | 137/596.12 |
| 4,276,810 | 7/1981 | Zeuner et al. | 137/596.12 |
| 4,345,736 | 8/1982 | Zeuner et al. | 137/596.12 |
| 4,658,705 | 4/1987 | Maeda | 137/596.12 |
| 4,861,068 | 8/1989 | McCabe | 280/714 |

FOREIGN PATENT DOCUMENTS

| | | | |
|---|---|---|---|
| 3742883 | 7/1989 | Fed. Rep. of Germany | 280/714 |
| 226411 | 9/1989 | Japan | 280/714 |
| 9002663 | 3/1990 | PCT Int'l Appl. | 280/714 |
| 2222445 | 3/1990 | United Kingdom | 280/714 |

Primary Examiner—Charles A. Marmor
Assistant Examiner—Tamara L. Finlay
Attorney, Agent, or Firm—Wenderoth, Lind & Ponack

[57] ABSTRACT

A suspension control system for controlling the attitude of a vehicle has a hydraulic fluid supply source mechanism connected to a suspension unit of the vehicle through a hydraulic fluid supplying and discharging device for controlling the supply and discharge of hydraulic fluid to and from the suspension unit. The hydraulic fluid supply source mechanism includes a pump and a reservoir tank. The hydraulic fluid supply source mechanism further includes an unload line connecting a discharging port of the pump to the reservoir tank and an unload valve disposed in the unload line. The unload valve has an electromagnetic proportional valve and is controlled such that the current to be supplied thereto gradually increases and decreases when the valve is opened and closed, respectively.

12 Claims, 4 Drawing Sheets

SUSPENSION CONTROL SYSTEM

BACKGROUND OF THE INVENTION

1. Field of the Invention

The present invention relates to a suspension control system for controlling the attitude of a vehicle.

2. Prior Art

There have conventionally been proposed various types of active suspension systems which are designed to suppress changes in the attitude of a vehicle, such as rolling, which occurs during cornering, and squat or dive phenomenon, which respectively occur when a vehicle is rapidly starting or being braked, so as to improve the driving reliability and ride of the vehicle and to control the height of the vehicle. Explanation will be given for one example of such a suspension control system in reference FIG. 1.

Each suspension unit 1 disposed between a vehicle body and respective wheels comprises a cylinder 2 which extends and contracts in response to the supply thereto and discharge therefrom of hydraulic fluid to adjust the relative displacement between the vehicle body and the wheel, an accumulator 3 connected to the cylinder 2 and designed to act as a spring element, and a throttle valve 4 disposed in the line connecting the cylinder 2 and the accumulator 3 and designed to generate a damping force. It should be noted that the figure only shows two suspension units, either for the front wheels or for the rear wheels. Since the two suspension units are controlled in the same manner, the following explanation will be given with respect to one of them.

A supply and discharge means 8 is disposed between lines 6 and 7 for each suspension unit 1, which lines are respectively connected to the cylinder 2 of the suspension unit 1 and to a hydraulic fluid supply source mechanism 5 for supplying hydraulic fluid to the cylinder 2. The supply and discharge means is provided with an electromagnetic proportional control valve 9 of a three ports and three positions type. When the solenoid of the control valve 9 is energized, the control valve 9 is selectively switched from a neutral position a to a hydraulic fluid supplying position b and a hydraulic discharging position c to respectively supply and discharge the hydraulic fluid to and from the suspension unit 1. Reference numeral 10 designates a pilot check valve which is provided in order to prevent leakage of the hydraulic fluid from the cylinder 2 to a reservoir tank 11, since hydraulic fluid may otherwise leak through the control valve 9 when the control valve is in the neutral position a. The pilot check valve 10 is controlled by means of an electromagnetic switching valve 12 of a three ports and two position type. When the switching valve 12 applies a pilot pressure to the pilot check valve 10, the pilot check valve 10 is opened to connect the cylinder 2 with the proportional control valve 9. When the switching valve 12 does not apply any pilot pressure to the pilot check valve 10, the pilot check valve 10 acts as a normal check valve to allow the flow of the hydraulic fluid from the control valve 9 to the cylinder 2 and to prevent the flow of hydraulic fluid in the reverse direction.

Next, explanation of the hydraulic fluid supply source mechanism 5 will be given. The hydraulic fluid supply source mechanism 5 comprises a pump 13, a check valve 14 which prevents the hydraulic fluid discharged from the pump 13 from flowing back to the pump 13, an accumulator 15 which accumulates therein the hydraulic fluid discharged by the pump 13, a pressure detecting means (not shown) for detecting the pressure in the accumulator 15, an unload line 16 connecting the discharge port of the pump 13 and the reservoir tank 11, and an unload valve 17 disposed in the unload line 16. The unload valve 17 is an electromagnetic switching valve. With the constitution mentioned above, the hydraulic fluid discharged from the pump 13 is accumulated in the accumulator 15 and, when the pressure detecting means detects a predetermined pressure in the accumulator 15, the unload valve 17 is switched over to return the hydraulic fluid discharged from the pump 13 to the reservoir tank 11, thereby retaining the pressure in the accumulator at a predetermined level.

It should be noted that the valves 9, 12 and 17 are controlled by means of a control unit (not shown), which receives signals from a speed sensor, steering angle sensor, acceleration sensor, vehicle height sensor and so on (not shown), and outputs directing signals to the valves for retaining the inclination and height of the vehicle at the optimum condition in response to the signals from the sensors.

However, the suspension control system explained above suffers from the following problems.

When the system is in the on-load condition where the hydraulic fluid discharged from the pump 13 is supplied to the suspension unit 1, the engine bears a heavy load, while the engine bears little load when the system is in the unload condition where the hydraulic fluid discharged from the pump 13 is returned to the reservoir tank 11 through the unload valve 17. When the system is switched between the on-load and unload conditions, therefore, the engine suffers from large changes in torque, thereby causing a deterioration in driving reliability and an erratic and uncomfortable ride.

In addition, when the system is switched over between the on-load and unload conditions, shock noise and vibration are generated by virtue of surge pressure which is generated by the sudden opening or closing of the unload valve 17.

SUMMARY OF THE INVENTION

The object of the present invention is, therefore, the provision of a suspension control system which effectively prevents the occurrence of surge pressure and sudden changes in engine torque.

The present invention provides a suspension control system comprising a hydraulic fluid supply source mechanism connected through a hydraulic fluid supplying and discharging means to a cylinder of a suspension unit disposed between a vehicle body and a wheel, the hydraulic fluid supply source mechanism including a pump and a reservoir tank, the hydraulic fluid supplying and discharging means being controlled to supply and discharge hydraulic fluid to and from the cylinder so as to control the attitude of the vehicle, characterized in that the hydraulic fluid supply source mechanism further includes an unload line connecting a discharge port of the pump to the reservoir tank, and an unload valve disposed in the unload line, the unload valve comprising an electromagnetic proportional valve designed to be controlled such that the current to be supplied to the proportional valve gradually increases and decreases when the proportional valve is opened and closed, respectively.

In the suspension control system provided with the constitution mentioned above, the current to be supplied to the unload valve, which is an electromagnetic valve, is controlled to gradually increase and decrease when the valve is opened and closed, respectively, so that an opening and closing motion of the valve is slower than it would otherwise be, thereby preventing the occurrence of surge pressure and enabling a slow change in the load acting on the engine, which results in the prevention of sudden changes in engine torque.

DETAILED DESCRIPTION OF THE PREFERRED EMBODIMENT

Figure 2:
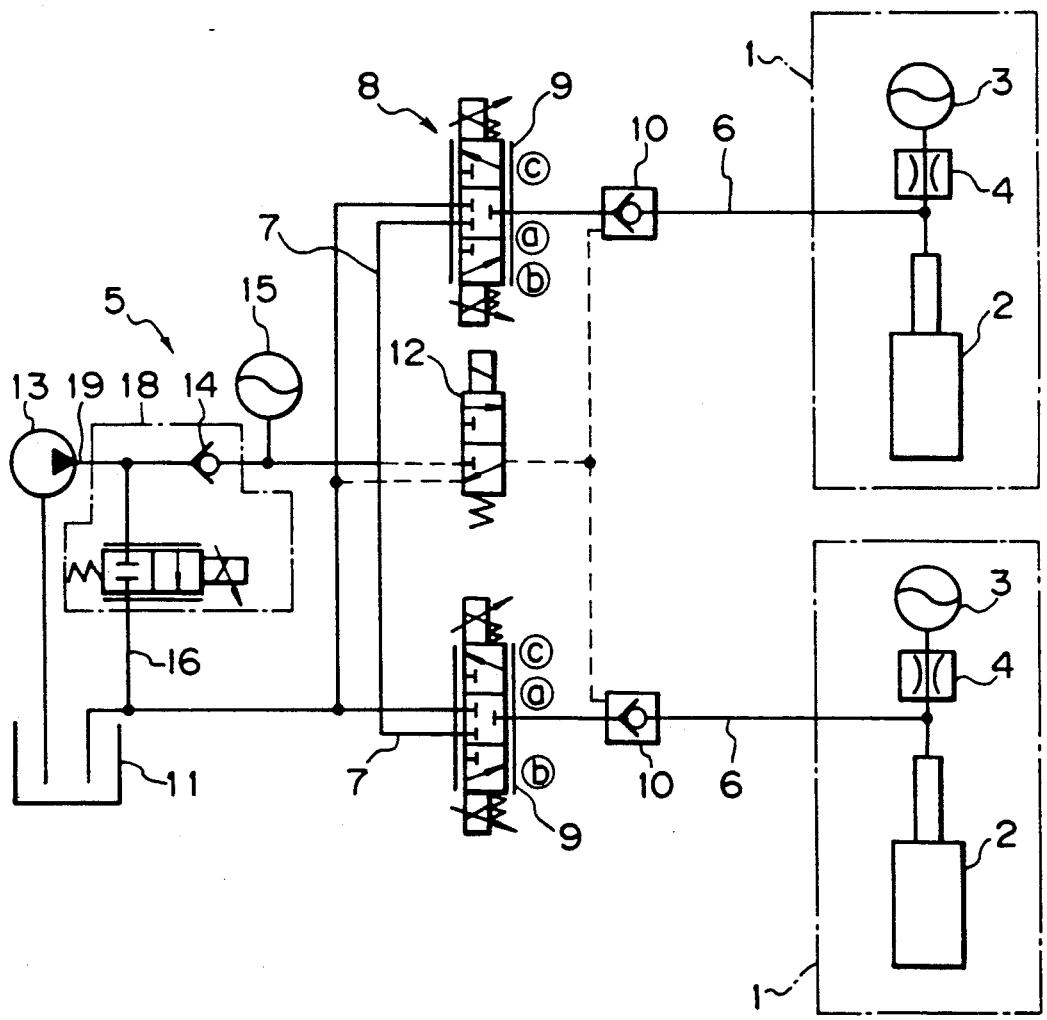
FIG. 2 is a schematic view showing a preferred embodiment of the present invention.
Figure 3:
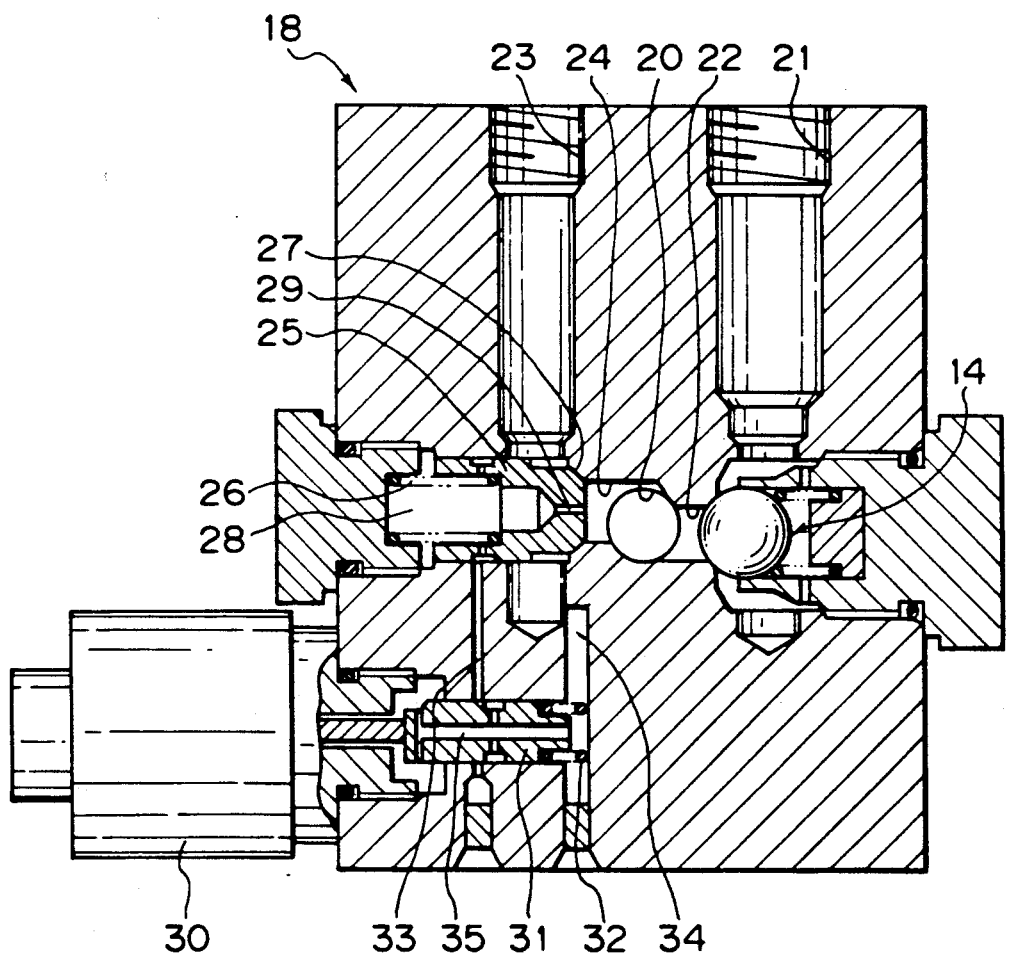
FIG. 3 is an elevational sectional view of an unload valve which can be employed in the system shown in FIG. 2.
Figure 4:
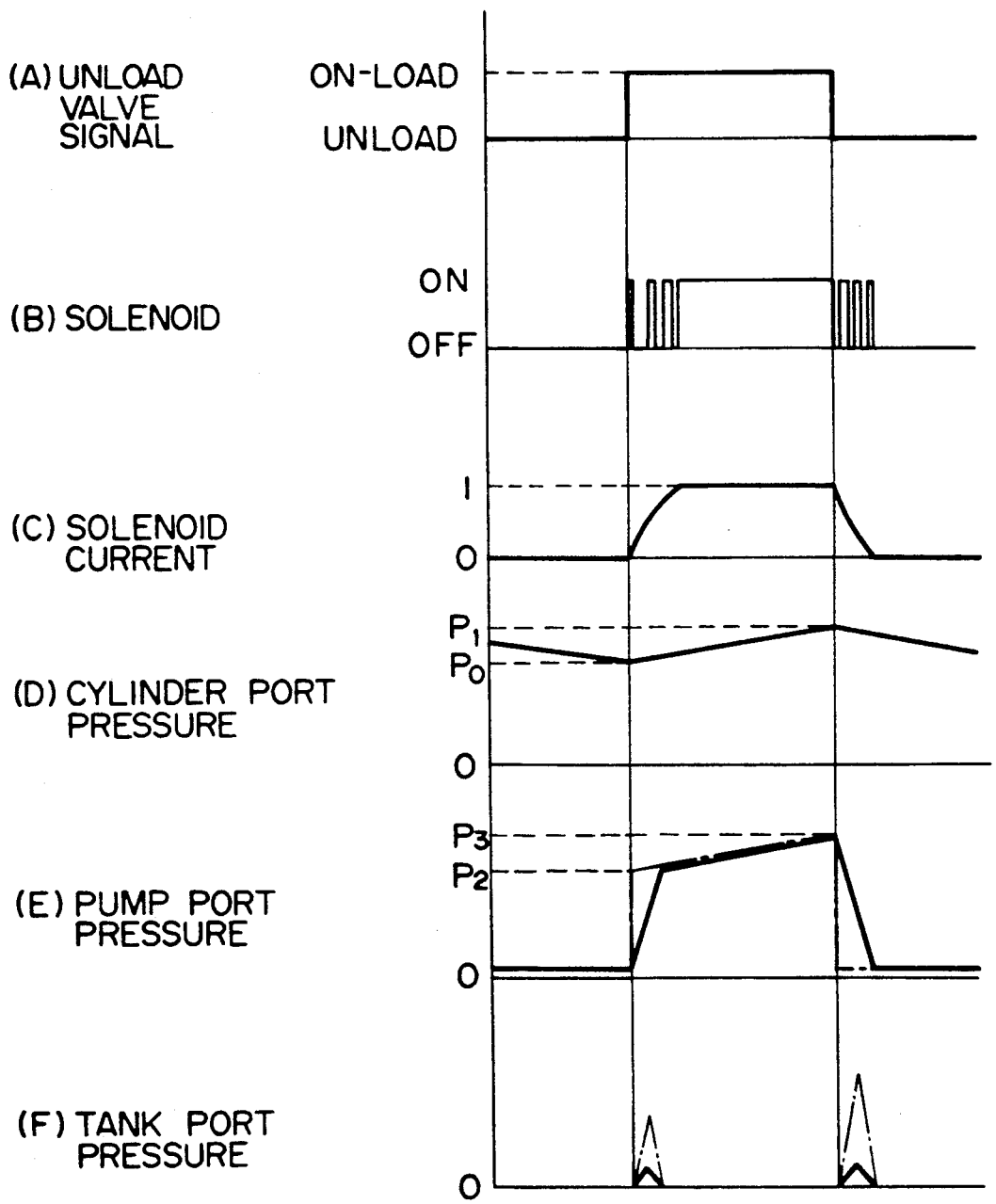
FIG. 4 is a time chart showing the operation of the unload valve.

Referring now to FIGS. 2 to 4, a preferred embodiment of the present invention will be given.

Figure 1:
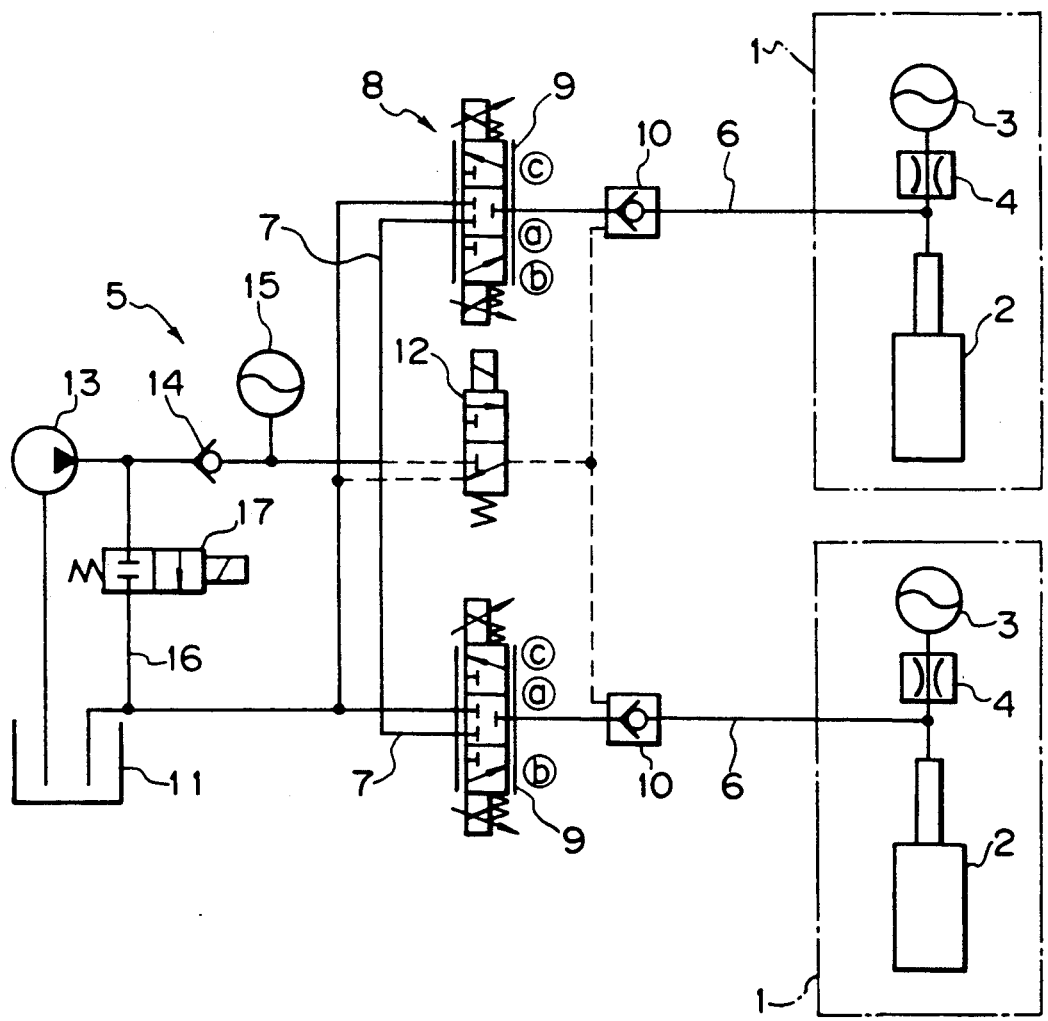
FIG. 1 is a schematic view showing a conventional suspension control system.

Since the embodiment is different from the conventional system explained in reference to FIG. 1 only in the hydraulic fluid supply source mechanism, other elements thereof are given the same reference numerals as used in FIG. 1 and the detailed explanation thereof will be omitted.

As shown in FIG. 2, an unload valve 18 is disposed in an unload line 16 which connects a discharge port of a pump 13 to a reservoir tank. The unload valve 18 is an electromagnetic valve in which the opening of the valve varies in response to the value of the current to be supplied to the valve 18.

Referring to FIG. 3, the constitution of one unload valve which can be used will be explained. It should be noted that the unload valve 18 incorporates therein a check valve 14 for preventing the hydraulic fluid discharge from the pump from flowing back.

Shown at 20 is a pump port connected to a line 19 which is in turn connected to a discharging port of the pump 13. Reference numeral 21 designates a cylinder port connected to a line 7 which is in turn connected to a proportional valve 9 of a hydraulic fluid supplying and discharging means 8. The pump port 20 and the cylinder port 21 are communicated with each other through a passage 22. The check valve 14 is provided in the passage 22. The check valve 14 only allows flow of fluid from the pump port 20 to the cylinder port 21. The pump port 20 further communicates through a passage 24 with a tank port 23 which is connected to the unload line. A main valve 25 is disposed in the passage 24. The main valve is normally biased by a spring 26 to seat on a valve seat 27 formed in the passage 24 so as to interrupt the passage 24. A pressure chamber 28 is defined on the side of the main valve remote from valve seat 27 and communicates with the passage 24 through a small orifice passage 29 formed in the main valve 25.

The unload valve 18 further includes a pilot valve 31 disposed therein and biased by a spring 32 in the leftward direction as viewed in FIG. 3. The pilot valve 31 is connected to a solenoid 30, and moves rightward as viewed in the figure against the biasing force of the spring 32 when the solenoid is energized. A passage 33 is formed to extend from the pressure chamber 28 to a bore in which the pilot valve 31 is reciprocably received. Another passage 34 is also formed to extend from the tank port 23 to the side of the pilot valve 31 on which the spring 32 is acting. When the solenoid 30 is not energized, the pilot valve 31 is positioned in its leftward position, and passages 33 and 34 communicate with each other through a communicating passage 35 formed in the pilot valve. When the solenoid 30 is energized, the pilot valve 31 is move rightward and the communication between the passages 33 and 34 is interrupted.

Electric power supply to the solenoid 30 is controlled by using Pulse Width Modulation Control on the basis of the signals from a control device.

Next, the operation of the suspension control system provided with the constitution mentioned above will be explained.

If the pressure in the accumulator 15 is above a predetermined value $P_0$ when the engine is started, the solenoid 30 is not energized so that the pressure chamber 28 and the tank port 23 communicate with each other through the passages 33 and 34 and the communicating passage 35. As a result, the pressure in the pressure chamber 28 is low (it is substantially equal to the atmospheric pressure), so that the hydraulic fluid discharged from the pump 13 which is driven by the engine opens the main valve 25 to return to the reservoir tank 11 through the unload line 16 (unload condition). It is noted that the check valve is not opened by the fluid introduced through the pump port 20, since the pressure in the cylinder port 21 is high.

When there is a need to control the attitude and/or the height of the vehicle, the control unit outputs signals. Each of the electromagnetic proportional valves 9 of the hydraulic fluid supplying and discharging means 8 is suitably controlled to connect the cylinder 2 of the suspension unit 1 either to the accumulator 15 or to the reservoir tank 11 through the proportional valve 9 so as to supply or discharge the hydraulic fluid to or from the cylinder 2. When the fluid in the accumulator 15 is supplied to the cylinder so that the pressure in the accumulator 15 decreases below the predetermined value $P_0$, solenoid 30 is energized so that the system is switched over from the unload condition to the on-load condition. The pressure in the accumulator 15 is on the same level as the pressure in the cylinder port 21, which is shown in FIG. 4 at (D).

When the solenoid 30 is energized, the pilot valve 31 is displaced rightward against the biasing force of the spring 32 to interrupt the communication between the pressure chamber 28 and the tank port 23. In this condition, the hydraulic fluid discharged from the pump 13 and introduced into the pump port 20 passes through the orifice passage 29 into the pressure chamber 28, so that the pressure in the pressure chamber 28 become equal to that in the pump port 20, thereby closing the main valve 25. Simultaneously, the hydraulic fluid introduced into the pump port 20 opens the check valve 14 to flow into the accumulator 15, since the pressure in the accumulator 15 has lowered. Thus, the system is switched to the on-load condition. During this operation, the electric power supply to the solenoid 30 is controlled by using Pulse Width Modulation Control to apply voltage to the solenoid 30 such that the width of pulses becomes gradually wider, as shown in FIG. 4 at (A), so that the current passing through the solenoid 30 gradually increases as shown in FIG. 4 at (C). As a result, operation of the solenoid 30 is slower than in the case where a current I is supplied from the start, so that the pilot valve 31 moves more slowly and the main valve 25 is, in turn, closed more slowly, thereby effecting a slower interruption of the communication between the pump port 20 and the tank port 23. The pressure in the pump port 20, therefore, increases to $P_2$ more slowly than in the case of the conventional system as shown in FIG. 4 at (E) in which the solid line and the one-dotted line designate the present invention and the conventional system, respectively. Further, the pressure in the tank port 23 is designated by a solid line in FIG. 4 at (F). In this manner, the generation of surge pressure is substantially prevented. For the purpose of comparison, the surge pressure generated in the conventional control system is shown by a one-dotted line in FIG. 4 at (F). Further, the load acting on the engine also changes more slowly, so that changes in the engine torque are made smoother.

When the pressure in the accumulator 15 and thus the pressure in the cylinder port 21 reach another predetermined value $P_1$ which is higher than $P_0$, the power supply to the solenoid 30 is stopped to change the operation mode of the system to the unload condition from the on-load condition. When the power supply to the solenoid 30 is stopped, the pilot valve 31 is moved leftward by means of the spring 32 so that the pressure chamber 28 communicates with the tank port 23 through the passages 33 and 34 and the communicating passage 35. As a result, a pressure difference is generated between the pressure in the pump port 20 and that in the pressure chamber 28 so that the hydraulic fluid from the pump port 20 opens the main valve 25 against the spring 26, whereby the hydraulic fluid introduced through the pump port 20 returns to the reservoir tank 11 through the unload line 16. Thus, the system is switched to the unload condition. During this operation of switching from the on-load condition to the unload condition, power supply to the solenoid is also controlled by using Pulse Width Modulation Control to gradually decrease the current being applied to the solenoid 30, so that the solenoid 30 operates more slowly and the main valve is also opened more slowly. Similar to the case in which the system is switched to the on-load condition from the unload condition explained above, therefore, during the switching of the system to the unload condition from the on-load condition, the pressure in the pump port 20 decreases from $P_3$ more slowly than in the case of the conventional system as shown in FIG.. 4 at (E). As a result, the generation of surge pressure in the tank port 23 is substantially suppressed as shown in FIG. 4 at (F) and changes in the engine torque are made smoother.

In the embodiment explained above, the current to be supplied to the solenoid 30 is controlled to gradually increase or decrease by using Pulse Width Modulation Control. However, Pulse Frequency Modulation may be used to gradually increase the frequency of the pulse when supplying power to the solenoid 30 and to gradually decrease the frequency of the pulse when suspending the power supply to the solenoid 30, thereby gradually increasing and decreasing the current supplied to the solenoid 30, respectively.

Further, voltage to be applied to the solenoid 30 may be directly controlled to gradually increase and decrease the current to be supplied to the solenoid 30.

In order to open and close the unload line 16, the embodiment explained above employs a pilot type unload valve 18 which includes the main valve 25 and a proportionally controlled pilot valve 31 for actuating the main valve. However, the opening and closing of the unload line 16 may be controlled by another type of unload valve in which the main valve is directly controlled by a solenoid.

As explained above, the suspension control system according to the present invention includes an unload valve disposed in an unload line connecting a discharge port of a pump and a reservoir tank arranged in a hydraulic fluid supply source mechanism with each other, the unload valve comprising an electromagnetic proportional valve designed to be controlled such that the current to be supplied to the valve gradually increases and decreases. During switching of the operational mode of the system between the on-load and the unload conditions, therefore, the generation of surge pressure is substantially suppressed to prevent the occurrence of noise and vibration, thereby ensuring a more stable and comfortable ride. Further, the engine does not suffer from large changes in torque as in the case of the conventional system. As a result, the driving reliability and degree of ride comfort is substantially improved.

What is claimed is:

1. A suspension control system for controlling the attitude of a vehicle, comprising:
    a hydraulic fluid supply comprising a reservoir tank and a pump connected thereto, said pump having a discharging port;
    a suspension unit for disposition between a vehicle body and a wheel of the vehicle, said suspension unit having a cylinder;
    a hydraulic fluid supply and discharge means, connected to said discharging port of said pump, said reservoir tank and said cylinder, being controlled selectively for supplying and discharging hydraulic fluid to and from said cylinder for controlling the attitude of the vehicle;
    a fluid line connecting said discharging port of said pump to said hydraulic fluid supply and discharge means, said fluid line having a check valve therein for allowing hydraulic fluid to flow from said pump to said hydraulic fluid supply and discharge means and preventing hydraulic fluid from flowing from said hydraulic fluid supply and discharge means to said pump; and
    an accumulator disposed in said fluid line between said check valve and said hydraulic fluid supply and discharge means;
    wherein said hydraulic fluid supply further comprises an unload line connecting said discharging port of said pump to said reservoir and an unload valve means disposed in said unload line for being controlled to open when the hydraulic fluid pressure in said fluid line between said check valve and said hydraulic fluid supply and discharge means is higher than a first predetermined value and close when the hydraulic fluid pressure in said fluid line between said check valve and said hydraulic fluid supply and discharge means is lower than a second predetermined value lower than said first predetermined value, said unload valve means comprising an electomagnetic proportional valve controlled such that current supplied to said proportional valve gradually increases and decreases to gradually increase and decrease the opening of said proportional valve when said proportional valve is opened and closed, respectively.

2. The suspension control system of claim 1, wherein said proportional valve includes a main valve controlling the flow of hydraulic fluid through said unload line and a pilot valve for controlling said main valve, said pilot valve being electromagnetically controlled such that the opening of said main valve gradually increases and decreases corresponding to the increase and decrease in current supplied to said pilot valve.

3. The suspension control system of claim 2, wherein said unload valve means further comprises a casing having said check valve therein together with said main valve and said pilot valve.

4. The suspension control system of claim 2, wherein:
said proportional valve has a valve seat for said main valve and defines a pressure chamber on a side of said main valve opposite to said valve seat;
a throttling passage extends through said main valve and fluidly connects said pressure chamber with said discharging port of said pump; and
a solenoid is connected to said pilot valve for actuating said pilot valve to increase and decrease the hydraulic fluid pressure in said pressure chamber in response to an increase and decrease of current to said solenoid.

5. The suspension control system of claim 4, wherein said unload valve means further comprises a casing having said check valve therein together with said main valve and said pilot valve.

6. The suspension control system of claim 1, wherein said electromagnetic proportional valve is controlled by pulse width modulation control.

7. A suspension control system for controlling the attitude of a vehicle, comprising:
a hydraulic fluid supply comprising a reservoir tank and a pump connected thereto, said pump having a discharging port;
a suspension unit for disposition between a vehicle body and a wheel of the vehicle, said suspension unit having a cylinder;
a hydraulic fluid supply and discharge means connected to said discharging port of said pump, said reservoir tank and said cylinder being controlled selectively for supplying and discharging hydraulic fluid to and from said cylinder for controlling the attitude of the vehicle;
wherein said hydraulic fluid supply further comprises an unload line connecting said discharging port of said pump to said reservoir and an unload valve means disposed in said unload line including an electromagnetic proportional valve controlled such that current supplied thereto gradually increases and decreases to gradually increase and decrease the opening of said proportional valve when said proportional valve is opened and closed, respectively.

8. A suspension control system as claimed in claim 7, wherein said proportional valve comprises a main valve for controlling the flow through said unload line and a pilot valve for controlling said main valve such that the opening of said main valve gradually increases and decreases in correspondence to the increase and decrease in current supplied to said pilot valve.

9. A suspension control system as claimed in claim 8, wherein said unload valve means further includes a check valve for allowing a flow of hydraulic fluid from said pump to said cylinder of said suspension unit and for preventing a flow of hydraulic fluid from said cylinder to said pump, said check valve being received within a casing together with said main valve and said pilot valve.

10. The suspension control system of claim 8, wherein:
said proportional valve has a valve seat for main valve and defines a pressure chamber on a side of said main valve opposite to said valve seat;
a throttling passage extends through said main valve and fluidly connects said pressure chamber with said discharging port of said pump; and
a solenoid is connected to said pilot valve for actuating said pilot valve to increase and decrease the hydraulic fluid pressure in said pressure chamber in response to an increase and decrease of current to said solenoid.

11. A suspension control system as claimed in claim 10, wherein said unload valve means further includes a check valve for allowing a flow of hydraulic fluid from said pump to said cylinder of said suspension unit and for preventing a flow of hydraulic fluid from said cylinder to said pump, said check valve being received within a casing together with said main valve and said pilot valve.

12. The suspension control system of claim 7, wherein said electromagnetic proportional valve is controlled by pulse width modulation control.

* * * * *